US006593420B1

(12) United States Patent
Helbing

(10) Patent No.: US 6,593,420 B1
(45) Date of Patent: Jul. 15, 2003

(54) FIBER GLASS BINDER COMPOSITIONS WITH REDUCED DUSTING

(75) Inventor: Clarence Henry Helbing, Shelbyville, IN (US)

(73) Assignee: Knauf Fiber Glass GmbH, Shelbyville, IN (US)

( * ) Notice: Subject to any disclaimer, the term of this patent is extended or adjusted under 35 U.S.C. 154(b) by 344 days.

(21) Appl. No.: 09/636,285

(22) Filed: Aug. 10, 2000

Related U.S. Application Data

(60) Provisional application No. 60/148,066, filed on Aug. 10, 1999.

(51) Int. Cl.[7] ......................... C08L 61/06; C08K 5/053; C08K 9/04; B05D 3/02
(52) U.S. Cl. ...................... 524/596; 524/320; 524/386; 523/217; 427/389.8
(58) Field of Search ................. 524/320, 386, 524/596; 427/389.8; 523/217

(56) References Cited

U.S. PATENT DOCUMENTS

| | | |
|---|---|---|
| 3,288,734 A | 11/1966 | Stalego |
| 3,300,427 A | 1/1967 | Hebert |
| 3,616,179 A | 10/1971 | McCombs et al. |
| 3,819,441 A | 6/1974 | Fargo et al. |
| 3,944,703 A | 3/1976 | Harding |
| 4,025,473 A | 5/1977 | Rifi |
| 4,045,398 A | 8/1977 | Dahms |
| 4,067,829 A | 1/1978 | Garrett |
| 4,076,873 A | 2/1978 | Shea |
| 4,210,562 A | 7/1980 | McCombs |
| 4,324,833 A | 4/1982 | Yau |
| 4,373,062 A | 2/1983 | Brown |
| 4,461,859 A | 7/1984 | Girgis |
| 4,476,191 A | 10/1984 | Girgis |
| 4,490,490 A | * 12/1984 | Patton, Jr. et al. |
| 4,495,329 A | 1/1985 | Blair et al. |
| 4,525,492 A | 6/1985 | Rastall et al. |
| 4,904,753 A | 2/1990 | Watts et al. |
| 4,982,781 A | * 1/1991 | Carpenter et al. |
| 5,137,931 A | * 8/1992 | Okumura et al. |
| 5,243,015 A | 9/1993 | Hutchings et al. |
| 5,324,337 A | 6/1994 | Helbing |
| 5,344,909 A | 9/1994 | Hutchings et al. |
| 5,473,012 A | 12/1995 | Coventry et al. |
| 5,578,371 A | 11/1996 | Taylor et al. |
| 5,708,121 A | 1/1998 | Parks et al. |

FOREIGN PATENT DOCUMENTS

| | | |
|---|---|---|
| EP | 0 913 413 A1 | 5/1999 |
| GB | 961029 | 6/1964 |
| GB | 1155004 | 6/1969 |
| WO | WO 99/60043 | 11/1999 |

* cited by examiner

*Primary Examiner*—Tae H. Yoon
(74) *Attorney, Agent, or Firm*—Barnes & Thornburg

(57) ABSTRACT

A resin binder composition useful in the manufacture of fiber glass articles is described. The resin binder is formulated to exhibit increased stress tolerance (flexibility) and to enable the manufacture of fiber glass products with less dusting with minimal compromise of physical strength characteristics.

13 Claims, No Drawings

FIBER GLASS BINDER COMPOSITIONS WITH REDUCED DUSTING

CROSS-REFERENCE TO RELATED APPLICATION

This application claims priority to U.S. provisional application Ser. No. 60/148,066, filed Aug. 10, 1999.

FIELD OF THE INVENTION

The present invention relates to an improved fiber glass composition. More particularly the invention is directed to a fiber glass composition including an improved resin binder having enhanced flexibility and reduced dusting.

BACKGROUND AND SUMMARY OF THE INVENTION

Fiber glass compositions find significant use as acoustical or thermal insulation in a wide variety of commercial applications. Generally fiber glass compositions are prepared by applying a resin binder composition including a resole (phenol-formaldehyde) resin and a catalyst to glass fibers; the binder-coated glass fibers are collected in the form of a non-woven fiber glass blanket. The fiber glass blanket is thereafter compressed and heated to cure the binder composition either in an oven ("line cure") to form batts, or in a mold to form compressed mats or other shaped fiber glass articles. During the heating step, the resin binder composition dispersed on the glass fibers polymerizes to form a cured resin solid that binds the glass fibers where they overlap to impart strength and resiliency to the fiber glass product. Fiber glass products formed using thermally cured resin binders thus retain their shape due to resin crosslinking of the component fiber glass particles.

Fiber glass batts, mats, and other shaped fiber glass products are often combined with other construction materials to form insulated products. If the cured binder resin does not exhibit some threshold flexibility, the fiber glass product can readily lose structural integrity as a result of handling and manipulation in the manufacture and installation of insulated products. Additionally, glass fiber dust can be generated during the handling and manipulation of the fiber glass product and during the useful life span of the final product, as the fiber glass product cracks and disintegrates under applied stress.

There have been significant research and development efforts directed to improving resin binder compositions useful in the manufacture of fiber glass articles. The present invention is based on the development and use of novel catalyzed resole resin binder compositions which exhibit increased stress tolerance (flexibility) and concomitantly less friability and dusting without substantial compromise of physical strength characteristics.

The improved resin binder composition in accordance with this invention includes an aqueous solution comprising a resole resin, catalyst, and a flexibilizer. The compositions include about 60% to about 90% by weight water and about 10% to about 40% by weight binder solids. The flexibilizer component(s) have polyhydric-functional and/or acid-functionality and typically form about 20 to about 50 percent per weight of the binder solids. The solid component of the binder composition optionally, but preferably, includes, an —$NH_2$ functional resole reactive compound selected from the group consisting of urea, melamine, dicyandiamide, and methylol and $C_1$–$C_4$ alkoxymethyl derivatives thereof. The resin binder composition when used in the manufacture of thermally cured fiber glass compositions is characterized by improved flexibility and reduced dusting without substantial compromise of physical strength characteristics. The chemical/mechanical properties of the improved resin binder composition allow preparation of fiber glass compositions exhibiting advantages in many applications.

In one embodiment of the present invention, the resin binder composition comprises an aqueous solution of resin solids comprising a resole resin, a catalyst, and both polyhydric-functional and acid-functional flexibilizers. The resin solids comprise about 45 to 65 percent weight of the resin binder composition, while the flexibilizers comprise about 10 to about 25 percent by weight of solids each. The preferred acid-functional flexibilizers are water dispersible oils. Examples of water dispersible oils include maleinized unsaturated oils such as linseed-tung oil or soybean oils, sulfonated oils such as sulfonated fish oil or lard oil, and sulfited oils such as bisulfited herring oil. Polyhydric flexibilizers are polyhydric alcohols, including di-, tri-, tetra-, and pentahydric alcohols having a molecular weight of less than 10,000, more preferably less than 5000, for example, Pentek ($C(CH_2OH)_4$), trimethylol propane, propoxylated trimethylolpropane, and propoxylated pentaerythritol.

In another embodiment, the flexibilizer consists essentially of one or more polyhydric-functional compounds forming about 30 to 45 percent of the weight of the resin solids. In still another embodiment, the flexibilizer component consists essentially of one or more acid-functional water dispersible oils forming about 15 to 35 percent of the resin solids.

Still another embodiment of the present invention is a process for preparing a fiber glass blanket characterized by improved flexibility and reduced dusting. The method comprises the steps of forming an improved aqueous resin binder composition comprising a resole resin, a catalyst, and a flexibilizer in a total amount of 15 to 45% of the resin solids, coating glass fibers with said improved resin binder compositions, collecting the coated glass fibers to provide the fiber glass composition in the form of a non-woven mat containing up to about 25% by weight of the resin binder composition on a solids basis, and drying the mat to a water content of less than 8% by weight. The process can further include the step of compressing the fiber glass blanket for storage and/or molding and curing the blanket for final use.

The solids of the present binder compositions also include a catalyst, and optionally may include an —$NH_2$ functional resole reactive compound, a silane in an amount effective to decrease resin hydrophilicity, and/or a surfactant to aid in solubilizing intermediates and maintaining the binder as a homogenous solution.

Additional features of the present invention will become apparent to those skilled in the art upon consideration of the following detailed description of preferred embodiments exemplifying the best mode of carrying out the invention as presently perceived.

DETAILED DESCRIPTION OF THE INVENTION

The present invention is directed to improved fiber glass compositions and to methods of preparation of such compositions using an improved resin binder composition, including a resole resin, a catalyst, and a polyhydric-functional and/or acid-functional flexibilizer. The composition may also include one or more resin binder modifiers, preferably urea, but other amines, such as melamine, and dicyandiamide, and methylol and $C_1$–$C_4$ alkoxymethyl derivatives thereof may be suitable. The acid-functional flexibilizers include water dispersible oils, such as maleinized, sulfonated oils, and sulfited oils while the polyhydric-functional flexibilizers include di-, tri-, tetra-, and penta-hydric alcohols having a molecular weight of less than 10,000, more preferably less than 5000. In preferred embodiments the catalyst for the resin binder composition consists of an anmmonium toluene sulfonic acid ("TSA") solution, but other catalysts are known and may be used in accordance with this invention. See, for example, U.S. Pat. No. 5,243,015 hereby incorporated by reference. It has been found that the use of flexibilizers, as taught in this invention, are useful in the manufacture of flexible fiber glass compositions.

Generally in the manufacture of the present fiber glass compositions an aqueous resin binder composition having about 10% to about 40%, more typically about 12% to about 35% solids is applied to hot glass fibers which are collected in the form of a non-woven blanket. The blanket is typically compressed and heat-cured either in a line oven or in a heated compression mold; or it is rolled and stored for later heat-cure processing. The amount of resin binder composition used in the manufacture of the fiber glass blankets depends significantly on the intended use of the fiber glass product. Thus the binder can constitute about 3% up to about 25% by weight on a solids basis of the uncured fiber glass blanket. More typically the amount of resin binder ranges from about 3% to about 20% by weight of the fiber glass blanket. Fiber glass blankets intended to be used in the manufacture of fiber glass batts can include as little as 3% resin binder. Fiber glass blankets intended for the manufacture of pipe insulation typically includes less than 10% by weight binder on a solids basis, more preferably less than about 8% by weight. Fiber glass compositions in accordance with this invention may be used as automobile head liners, wherein the composition may include approximately 15 to 20% of resin binder.

Fiber glass blankets manufactured in accordance with this invention, as mentioned above, are typically compressed and heat-cured either in a line oven to form batts or boards or in compression molds to form molded fiber glass constructs. Typically the fiber glass blankets are heated during that process to about 300° to about 500° F., more typically about 400° F., for a period of time sufficient to cure the binder component of the fiber glass blanket. It has been found that preferred embodiments of the present improved resin binder composition including a polyhydric-functional and/or acid-functional flexibilizer exhibit improved flexibility and less dusting. Such fiber glass compositions can withstand increased bending with less breakage than similar compositions lacking the flexibilizer. The resin binder portion of such fiber glass compositions is less friable and exhibits less dusting. Thus, products made from the fiber glass compositions of this invention have a longer useful life span. Moreover, installation of fiber glass components, such as automobile head liners, may take place with fewer fiber glass articles wasted due to breakage.

The resin binder compositions of the present invention include a resole resin, a flexibilizer, a catalyst, and optional binder modifiers. The resole resin is a phenol-aldehyde resin having a molar ratio of phenol to aldehyde of about 1:1.1 to about 1:5. Preferably the phenol to aldehyde ratio is from about 1:2 to about 1:3. Resole resins are commercially available from numerous resin suppliers. One commercially available resin that can be used for formulating the present improved binder composition is GP® 454T81 ("T81"), Georgia-Pacific Resins, Inc., Decatur, Ga.

The phenol component of the resole resin can include a variety of substituted and unsubstituted phenolic compounds. The aldehyde component of the resole resin is preferably formaldehyde but can include so-called masked aldehydes or aldehyde equivalents such as acetals or hemiacetals. Specific examples of suitable aldehydes include: formaldehyde, acetaldehyde, propionaldehyde, butyraldehyde, furfuraldehyde, and benzaldehyde.

Flexibilizers are added to the resin binder composition to improve flexibility and reduce dusting without sacrificing strength of the fiber glass composition. The flexibilizers of this invention include polyhydric-functional and acid-functional compounds. Preferably, the polyhydric-functional and acid-functional flexibilizers are present in about a 1:1 ratio and together comprise about 20 to 50 percent weight of the resin solids, most preferably about 40 percent weight of the solids. However, the ratio of polyhydric-functional flexibilizer to acid-functional flexibilizer may vary greatly, to the point that polyhydric-functional flexibilizers may be used in the absence of acid-functional flexiblizers and acid-functional flexibilizers may be used without polyhydric-functional flexibilizers.

The acid-functional flexibilizers of this invention are water dispersible oils. Preferred flexibilizers are maleinized oils, including maleinized linseed-tung oil and maleinized soybean oils. Examples of other water dispersible oils include sulfonated oils such as fish oils and lard oils, and sulfited oils such as bisulfited herring oils. Many such oils are available commercially. In some applications it may be preferable to use purified oils, especially for those applications in which odor may be a problem. Polyhydric flexibilizers are polyhydric alcohols, including di-, tri-, tetra-, and pentahydric alcohols having a molecular weight of less than 10,000, preferably less than 5,000. Examples of polyhydric-flexibilizers include Pentek ($C(CH_2OH)_4$), trimethylol propane, propoxylated trimethylolpropane, and propoxylated pentaerythritol. Polyhydric-functional flexibilizers are reactive in that they participate in the polymerization of the resin matrix and alter its structure. The acid-functional flexibilizers are also capable of participating in the polymerization reaction. However, the acid-functional flexibilizers may also impart flexibility in a non-reactive manner by acting as plasticizers.

The catalyst component of the resole resin binder composition of this invention comprises an amine salt of a strong acid, preferably a sulfonic acid. The nature/structure of the sulfonic acid is not critical provided that it is soluble in the aqueous resin binder composition and provided its acid functionality is capable of catalyzing polymerization of the resole resin. A preferred catalyst may be TSA. Other preferred catalysts may be ammonium sulfate or an ammonium salt of an aryl sulfonic acid.

The catalyst is typically used in an amount ranging from about 3 to about 15 parts per hundred of the solid content in the resin binder composition. Preferably, the catalyst is present in an amount from about 10 to about 12 parts per hundred on a solids basis. The solids content is the amount of solid residue that remains after all volatile components of the binder composition are removed. The percentage of solids content in the binder is determined by placing about 1.0 gram of the binder composition in an aluminum dish and drying the composition to dryness in a circulating oven at 300° F. The weight of the dried composition is divided by the weight of the aqueous binder then multiplied by 100 to obtain the percentage of solids content in the binder.

The resin binder composition can be formulated to contain up to about 20% by weight on a solids basis of a binder modifier. Preferred binder modifiers are urea and silanes. Preferably, urea may be used in amounts up to about 50% of the resin solids, with 10% being most preferable. Urea is typically added to act as a formaldehyde scavenger and a binder extender. Urea readily combines with the free aldehyde in the resin under mildly alkaline or neutral pH conditions. It is important to reduce the free aldehyde content because aldehyde emissions, either during the curing process or later from the cured fiber glass article, are undesirable. The addition of urea to the present resin binder composition reduces aldehyde emissions, improves the efficiency of resin cure and ultimately reduces the cost of the resin binder composition. Silanes, such as Silquest A1101, may be used in small amounts, preferably less than 1%, and most preferably about 0.2%. These modifiers impart thermal stability to the cured fiber glass product and they work to otherwise improve binder performance. Silanes also decrease the hydrophilicity of the resin, thereby reducing the ability of the fiber glass product to attract moisture.

Surfactants may also be added to the resin binder composition to help solubilize intermediates and products formed from the condensation reaction between the phenol, the aldehyde and other binder additives. In addition, surfactants or additives help disperse the condensation products and prevent agglomeration of these products to provide or maintain the binder as a homogeneous solution. Suitable surfactants include but are not limited to glycols, glycol ethers or esters, methoxylated alcohols, alkyl sulfonates and alkyl phosphonates.

The molded fiber glass compositions prepared using the improved resins of this invention are expected to exhibit acceptable structural characteristics with improved flexibility and reduced dusting. Flexural, tensile, and compressive strengths of the molded fiber glass articles may be evaluated according to ASTM standard testing protocol D 638-91 "Standard Text Methods for Tensile Properties of Plastics" and D 790-92 "Standard Test Methods for Flexural Properties of Unreinforced and Reinforced Plastics in Electrical Insulating Materials," and C 165-95 "Standard Test Methods for Measuring Compressive Properties of Thermal Insulations," respectively. Dusting is evaluated according to the General Motors 9627P:R1:CPCKMT dust fallout procedure.

Thus, another embodiment of the present invention is a process for preparing a fiber glass blanket comprising glass fibers and a resin binder composition, wherein said fiber glass blanket is characterized by improved flexibility and reduced dusting compared to similar fiber glass compositions lacking the flexibilizer and/or reactive diluent. The method comprises the steps of forming an improved aqueous resin binder composition comprising a resole resin, a catalyst, and a flexibilizer in a total amount of 30 to 40% of the resin solids, coating glass fibers with said improved resin binder compositions, collecting the coated glass fibers to provide the fiber glass composition in the form of a non-woven mat containing up to about 25% by weight of the resin binder composition on a solids basis, and drying the mat to a water content of less than 8% by weight. The process can further include the step of compressing the fiber glass blanket for storage and/or molding and curing the blanket for final use.

EXAMPLES

The following examples are set forth to illustrate the principles and practices of the present invention to one skilled in the art. They are not intended to be restrictive but merely to be illustrative of the invention. Unless otherwise stated, all parts, percentages and ratios are on a weight basis. All water was passed through a zeolite filled column to remove calcium and magnesium salts from the water. Solids for the following examples were generated by placing 1 gram of resin mixture in a pan and drying the resin in a circulating oven for 30 minutes at 300° F. The dry residue is weighed to determine the weight of solids. The percentage of solids content was determined by multiplying the ratio of the weight of dried, cured resin to the weight of the resin by 100 to obtain the percentage of solids content in the binder.

Flexibility was determined by a pipe test employing a series of pipes of differing diameter. Starting with the pipe of largest diameter, the dry residue was placed against the exterior of the pipe. The resin passed this phase of the test if it does not crack or break when pressed flush against the exterior surface of the pipe. The test is repeated using pipes of decreasing diameter.

Preparation 1

Phenol-Formaldehyde-Urea Premix T81

Phenol/formaldehyde premix T81 was made to have a phenol-formaldehyde molar ratio of 1:3, with about 4.5% free phenol and 1.8% free formaldehyde. Sufficient water was added to yield an aqueous resole resin solution mixture having about 45% solids content. An aqueous solution of urea (40% by weight of urea) was added T81 premix in a ratio of 9:1 T81 premix to urea solution (by weight), while the resulting solution was stirred to ensure homogeneous mixing.

Preparation 2

Phenol-Formaldehyde-Urea Premix K-3-2A.

Phenol and formaldehyde in a phenol-formaldehyde molar ratio of 1:3.2 were reacted together to obtain a resole resin having about 1% free phenol and 7% free formaldehyde. Sufficient water was added to yield an aqueous resole resin solution mixture having about 51% solids content. Phenol-formaldehyde resin (6263 pounds), to which an aqueous solution of urea (3422 pound, 40% by weight of urea) was added, while the resulting solution was stirred to ensure homogeneous mixing. The temperature of the resulting solution was maintained from about 50° F. to about 70° F. (10° C. to about 21° C.). This premix solution had a density of about 9.69 lb/gallon and a solids content of about 47.1±2%.

Example 1

Preparation of a Resole Resin Binder Composition Containing Maleinized Linseed—Tung Oil To a stirred container 106.1 grams phenol-formaldehyde-urea premix (Preparation 2) was added. Next, a solution of 15.3 grams Pentek dissolved in 148.7 grams soft water at 116° F. was added. Temperature was reduced to 80° F., and 3.0 grams of ammonia were added. Eight minutes later, the ammonia was followed by the addition of 30.0 grams of maleinized linseed-tung oil (Ohio Polychemicals, Polychem 7238-100), and the temperature was reduced to 75° F. 30 grams 15% ammonium TSA solution and 0.2 grams of Silquest A1101 silane were added and stirred for 15 minutes. The resulting resin mixture was dried in a circulating oven for 30 minutes at 300° F. The pipe test showed some flexibility, but the material was too weak to provide good test results.

Example 2

Preparation of a Resole Resin Binder Composition Containing Maleinized Linseed-Tung Oil using Preparation 1

Preparation 1 was formed using 100.0 grams of T81 and 12.5 grams of urea solution. A Pentek solution was prepared by adding 19.8 grams of Pentek to 113.9 grams of soft water at about 160° F., to dissolve all of the Pentek. The Pentek solution was added to the mix, and the mix was 146° F. Five minutes later, 0.29 grams of ammonia were added, followed nine minutes later by 20.0 grams of maleinized linseed-tung oil (as used in Example 1). A few minutes later, 66.7 grams 15% ammonium TSA solution and 0.2 grams A1101 silane were added. The mixture was baked for 30 minutes at 300° F. The bakeout was yellow in color and could be flexed without breaking. The bakeout of this example passed the ¼ inch pipe test.

A comparable but larger-scale preparation was used to test dusting. An initial dust test according to the General Motors 9627P:R1:CPCKMT dust fallout procedure showed 49.9 mg of dust collected for the sample prepared with maleinized linseed-tung oil, as compared to 71.0 grams from the standard uncured amber resin and 95.5 to the standard uncured black resin. Thus, as compared to similar standard resins, the resins of the present invention may exhibit reduced dusting.

Example 3

Preparation of a Resole Resin Binder Composition Containing Sulfonated Fish Oil

The phenol/formaldehyde resin of Example 2 was prepared, except that 20.0 grams of sulfonated, oxidized fish oil (Atlas Refinery Inc., Eureka 400-R) was substituted for the maleinized linseed-tung oil of example 2. The resulting bakeout was tan in color, and it passed the ¼ inch pipe test.

Example 4

Preparation of a Resole Resin Binder Composition Containing Sulfonated Lard Oil

The phenol/formaldehyde resin of Example 2 was prepared, except that 20.0 grams of sulfonated, oxidized lard oil (Atlas Refinery Inc., Eureka 800-R) was substituted for the maleinized linseed-tung oil of example 2. The resulting bakeout was tan in color. It passed the ½ inch pipe test, but failed the ¼ inch pipe test.

Example 5

Preparation of a Resole Resin Binder Composition Containing Bisulfited Herring Oil

The phenol/formaldehyde resin of Example 2 was prepared, except that 20.0 grams of polymerized oxidized bisulfited herring oil (Böhme-Filtrex Cutapol TIS-MF3) was substituted for the maleinized linseed-tung oil of example 2. The resulting bakeout was tan in color. The bakeout of this example passed the 2 inch pipe test but failed the 1 inch pipe test.

What is claimed is:

1. A resin binder composition comprising an aqueous solution or dispersion of binder solids comprising a resole resin, a catalyst, and a flexibilizer wherein the flexibilizer comprises a polyhydric alcohol and an acid-functional water dispersible oil.

2. The resin binder composition of claim 1 further comprising an —$NH_2$ functional resole resin reactive compound selected from the group of urea, melamine, dicyandiamide, and methyl and $C_1$-$C_4$ alkoxymethyl derivatives thereof.

3. The resin binder composition of claim 1 wherein the flexibilizercomponent forms about 20 to about 50 percent of the resin solids by weight.

4. The resin binder composition of claim 1 wherein the polyhydric alcohol and the acid-functional water dispersible oil are present in about a 1:1 ratio by weight.

5. The resin binder composition of claim 1 wherein the acid-functional water dispersible oil is a maleinized oil.

6. The resin binder composition of claim 1 wherein the resin binder solids include about 45 to about 65 percent weight of the resole resin.

7. The resin binder composition of claim 1 further comprising a silane in an amount effective to decrease resin hydrophilicity.

8. The resin binder composition of claim 1 further comprising a surfactant in an amount effective to solubilize and disperse the binder solids.

9. A fiber glass composition comprising a non-woven mat of glass fibers wherein the glass fibers are coated with an aqueous resin binder composition comprising a resole resin, a catalyst, and a flexibilizer, wherein the flexibilizer comprises a polyhydric alcohol and an acid-functional water dispersible oil.

10. The fiber glass composition of claim 9 wherein the binder composition further comprises an —$NH_2$ functional resole resin reactive compound selected from the group of urea, melamine, dicyandiamide, and methylol and $C_1$-$C_4$ alkoxymethyl derivatives thereof.

11. The fiber glass composition of claim 9 wherein the acid-functional water dispersible oil comprises a maleinized oil.

12. A method for preparing a fiber glass composition comprising the steps of coating glass fibers with an aqueous resin binder composition comprising a resole resin a catalyst, and a flexibilizer, wherein the flexibilizer comprises a polyhydric alcohol and an acid-functional water dispersible oil, collecting the coated glass fibers in the form of a non-woven mat, and drying the mat to a water content of less than 8% by weight.

13. A method for preparing a fiber glass composition exhibiting good flexibility and tensile strength and low dust production comprising the steps of coating glass fibers with an aqueous resin binder composition comprising a resole resin, a catalyst and a flexibilizer, wherein the flexibilizer comprises a polyhydric alcohol and an acid-functional water dispersible oil, collecting the coated glass fibers in the form of a non-woven mat, drying the mat to a water content of less than 8% by weight, and compressing and heating the mat to a temperature sufficient to cure the dried resin binder composition.

* * * * *

UNITED STATES PATENT AND TRADEMARK OFFICE
CERTIFICATE OF CORRECTION

PATENT NO. : 6,593,420 B1  Page 1 of 1
DATED : July 15, 2003
INVENTOR(S) : Clarence Henry Helbing It is certified that error appears in the above-identified patent and that said Letters Patent is hereby corrected as shown below:

<u>Column 8,</u>
Line 6, change "flexibilizercomponent" to -- flexibilizer component --.

Signed and Sealed this

Twenty-sixth Day of August, 2003

JAMES E. ROGAN
*Director of the United States Patent and Trademark Office*